(12) United States Patent
Nishitani

(10) Patent No.: US 7,364,635 B2
(45) Date of Patent: Apr. 29, 2008

(54) MANUFACTURING METHOD OF PNEUMATIC TIRE

(75) Inventor: Kazuma Nishitani, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 323 days.

(21) Appl. No.: 11/115,010

(22) Filed: Apr. 26, 2005

(65) Prior Publication Data

US 2005/0236090 A1 Oct. 27, 2005

(30) Foreign Application Priority Data

Apr. 27, 2004 (JP) ............... 2004-131560

(51) Int. Cl.
*B29D 30/30* (2006.01)
*B29D 30/72* (2006.01)
(52) U.S. Cl. ............... 156/116; 156/117; 156/130.3; 156/130.7
(58) Field of Classification Search ............... 156/116, 156/117, 130.3, 130.7, 87; 152/524, DIG. 12
See application file for complete search history.

(56) References Cited

U.S. PATENT DOCUMENTS

| | | | | |
|---|---|---|---|---|
| 3,508,595 A | * | 4/1970 | Wilson | ............... 152/524 |
| 3,769,123 A | * | 10/1973 | Botts et al. | ............... 156/116 |
| 2002/0088529 A1 | * | 7/2002 | Ogawa et al. | ............ 156/128.6 |
| 2002/0166619 A1 | * | 11/2002 | Shimazaki | ............... 156/123 |
| 2006/0048878 A1 | * | 3/2006 | Ogawa | ............... 152/524 |

FOREIGN PATENT DOCUMENTS

| | | |
|---|---|---|
| JP | 9-1694 | 7/1997 |
| JP | 10-222070 | 8/1998 |
| JP | 2000-94542 A | 4/2000 |
| JP | 2002-79590 A | 3/2002 |
| JP | 2002-200677 A | 7/2002 |
| WO | WO 02/060676 A1 | 8/2002 |
| WO | WO-2004/037524 A1 * | 5/2004 |

* cited by examiner

*Primary Examiner*—Geoffrey L. Knable
(74) *Attorney, Agent, or Firm*—Knobbe Martens Olsen & Bear LLP

(57) ABSTRACT

The present invention provides a manufacturing method of a pneumatic tire in which a line, a letter or the like having a different color from a main body rubber is formed in a side wall portion. A manufacturing method of a pneumatic tire in which a portion having a different color from a main body rubber is formed in a side wall portion, is provided with a step of forming a band-like rubber member having a white rubber layer having a different color from a main body rubber, and a cover rubber layer formed in an outer side of the white rubber layer at a fixed thickness and having the same color as the main body rubber, and a step of spirally overlapping and winding a rubber ribbon along a tire peripheral direction so as to bond to both sides in a width direction of the band-like rubber member.

12 Claims, 3 Drawing Sheets

MANUFACTURING METHOD OF PNEUMATIC TIRE

BACKGROUND OF THE INVENTION

1. Field of the Invention

The present invention relates to a manufacturing method of a pneumatic tire in which a line, a letter or the like having a different color from a main body rubber is formed in a side wall portion.

2. Description of the Related Art

Conventionally, there has been known a pneumatic tire in which a line or a letter such as a maker logo having a different color from a main body rubber is formed in a side wall portion for the purpose of improving a fashion property. The pneumatic tire mentioned above can be manufactured, for example, by using a raw tire shown in FIG. 8. In FIG. 8, a white rubber layer 8 having a different color from a main body rubber is arranged in a side wall portion 31 of a raw tire, and a thin cover rubber layer 9 having the same color as the main body rubber is arranged in an outer side of the white rubber layer. The line, the letter or the like can be formed by vulcanizing the raw tire, thereafter scraping a predetermined region of the cover rubber layer 9 and exposing the white rubber layer 8 (refer to Japanese Unexamined Patent Publication No. 9-1694). Further, there has been known a method of vulcanizing by using a mold having a predetermined inner surface shape and protruding a predetermined region as shown in FIG. 9 in such a manner as to prevent the portion from which the cover rubber layer 9 is scraped from being formed in a groove shape. In accordance with the method mentioned above, it is possible to form the line, the letter or the like in an approximately flat surface by scraping a protruding portion 32 (refer to Japanese Unexamined Patent Publication No. 10-222070).

On the other hand, as a forming method of a side wall member structuring a side wall portion, there has been conventionally known a method in accordance with an extrusion molding, and a method in accordance with a ribbon winding. The formed side wall member is attached to a carcass ply wound around a drum together with the other rubber member. The raw tire can be formed by deforming the carcass ply along a tire shape and attaching a tread member.

In accordance with the former method, the side wall member can be formed by using an extruding machine and a molding die, extruding a rubber composition in a cross sectional shape of the side wall portion, and cutting at a predetermined length. However, in accordance with the method, it is necessary to prepare a lot of side wall members having various widths in order to correspond to each of the tire sizes, and it is necessary to prepare the side wall members having the white rubber layers of the respective widths in order to correspond to each of the sizes of the different color portions such as the line. As a result, there is a problem that the number of parts of the side wall member is increased. Further, it is necessary to change a stage such as a position adjustment every time of changing the tire size, and a productivity is lowered. In addition, since a step or the like is generated in a joint portion of the rubber member, a uniformity of the tire is lowered.

In accordance with the latter method, the side wall member is formed by spirally winding a rubber ribbon (a rubber strip) with an overlap in a tire peripheral direction (refer to Japanese Unexamined Patent Publication No. 2002-79590, Japanese Unexamined Patent Publication No. 2002-200677 and a pamphlet of International Publication 02/060676). Alternatively, the side wall member is formed by winding the rubber ribbon around an outer peripheral side of a formed product obtained by an extrusion molding (refer to Japanese Patent No. 3370282). Subsequently, each of the white rubber layer and the cover rubber layer is formed by winding the rubber ribbon around the outer periphery of the side wall member. However, in accordance with this method, it is hard to form the cover rubber layer thin at a uniform thickness. As a result, there is a problem that the white rubber layer is not uniformly exposed at the time of scraping the vulcanized cover rubber layer by a buff or the like, and a strain is generated on the buffed surface. This problem is significant in the case that a predetermined region of the cover rubber layer 9 is protruded as shown in FIG. 9. Further, since the rubber ribbon having a small cross sectional size is wound several times over, it takes a long time to form the tire, so that there is a problem that a productivity is lowered.

SUMMARY OF THE INVENTION

The present invention is made by taking the actual condition mentioned above into consideration, and an object of the present invention is to provide a manufacturing method of a pneumatic tire in which a line, a letter or the like having a different color from a main body rubber is formed in a side wall portion, which can reduce the number of parts in comparison with the prior art, is excellent in a uniformity and a productivity of the tire, and does not generate any strain on a surface where the line, the letter or the like is formed.

The object mentioned above can be achieved by the present invention as described below. In other words, in accordance with the present invention, there is provided a manufacturing method of a pneumatic tire in which a portion having a different color from a main body rubber is formed in a side wall portion, comprising:

a step of forming a band-like rubber member having a different color rubber layer having a different color from a main body rubber, and a thin rubber layer having the same color as the main body rubber formed in an outer side of said different color rubber layer at a fixed thickness; and a step of spirally winding a ribbon with an overlap along a tire peripheral direction, on both sides in a width direction of a position where said band-like rubber member is arranged.

In accordance with the manufacturing method of the pneumatic tire of the present invention, the side wall member can be formed by forming the band-like rubber member having the different color rubber layer having the different color from the main body rubber, and winding the rubber ribbon on both sides in the width direction at the position in which the band-like rubber member is arranged. Accordingly, it is possible to change the width of the side wall member and the position of the different color rubber layer by adjusting the winding of the rubber ribbon. As a result, it is not necessary to prepare the side wall member in correspondence to each of the tire sizes, so that it is possible to reduce the number of the parts. Since it is not necessary to change the state such as the position adjustment or the like at the time of changing the tire size, it is possible to improve a productivity. Further, since it is possible to inhibit the step from being generated in the joint portion of the rubber member on the basis of the structure of winding the rubber ribbon, and it is possible to finely adjust the cross sectional shape, it is possible to obtain an excellent uniformity. Further, it is not necessary to wind the rubber ribbon in an entire region by using the band-like rubber member, and the tire can be formed in a comparatively short time. The thin rubber layer is formed at the fixed thickness in the outer side of the different color rubber layer, and it is possible to form the different color portion such as the line, the letter or the like without generating any strain in the surface of the side wall portion. In this invention, the main body rubber means the rubber structuring a major part of the tire except the different color rubber layer.

In the structure mentioned above, it is preferable that the band-like rubber member has a side rubber layer which is arranged on both sides in a width direction of the different color rubber layer and has the same color as the main body rubber.

Since it is possible to delete the winding region of the rubber ribbon on the basis of the structure mentioned above, it is possible to effectively shorten a time required for forming the tire and it is possible to improve a productivity.

In the structure mentioned above, it is preferable that the step of forming the band-like rubber member consists of a step of extrusion molding the different color rubber layer and the side rubber layer while bonding them, and a step of attaching a thin rubber sheet obtained by a roll forming to a surface of the formed product obtained by the extrusion molding step.

In accordance with the method mentioned above, it is possible to accurately form the thin rubber layer thin at the fixed thickness as well as it is possible to easily form the band-like rubber member. Accordingly, it is possible to expose the different color rubber layer without generating any strain on the surface, whereby it is possible to preferably form the line, the letter or the like.

Further, it is preferable that the both side surfaces of the band-like rubber member form an inclined surface expanding to a lower side, and an air bleeding groove is formed in the inclined surface. In accordance with the structure mentioned above, since the both side surfaces of the band-like rubber member are constituted by the inclined surface expanding to the lower side, a gap is hard to be generated at the time of winding the rubber ribbon and a contact force becomes large. At this time, since the air bleeding groove is formed in the inclined surface, it is possible to effectively prevent a defect caused by mixing of the air.

DESCRIPTION OF THE PREFERRED EMBODIMENTS

Figure 1:
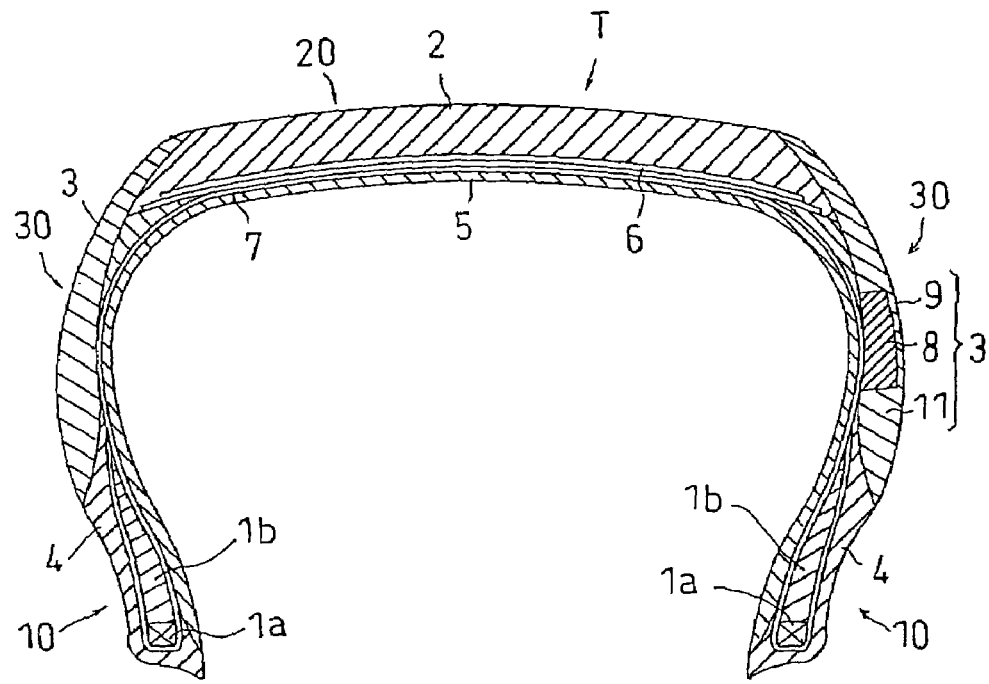
FIG. 1 is a cross sectional view showing one example of a raw tire.

A description will be given of an embodiment in accordance with the present invention with reference to the accompanying drawings. FIG. 1 is a cross sectional view showing an example of a raw tire. The raw tire T is provided with bead portions 10 in which a bead 1a consisting of a bundle of a bead wire and a bead filler 1b are arranged, side wall portions 30 respectively extending to outer sides in a tire radial direction from a pair of bead portions 10, and a tread portion 20 provided between the side wall portions 30. A carcass layer 7 is arranged between a pair of bead portions 10 so as to be bridged. An inner liner layer is arranged in an inner peripheral side of the carcass layer 7 for holding an air pressure, and a belt layer 6 achieving a reinforcement on the basis of a hoop effect is arranged in an outer peripheral side of the carcass layer 7. Further, the raw tire T is comprised of a plurality of rubber members, and is structured by a tread member 2, a side wall member 3, a rim strip member 4 and an inner liner member 5 in the example in FIG. 1. The tire structure mentioned above is the same as a general tire, and the present invention can be applied to any tire having the side wall portion 30.

The side wall member 3 has a white rubber layer 8 (corresponding to the different color rubber layer mentioned above) having a different color from the main body rubber, at least on a side (the right side in FIG. 1) forming an outer side at the time of being attached to a vehicle. The white rubber layer 8 is continuously arranged along a tire peripheral direction at a fixed width. A cover rubber layer 9 (corresponding to the thin rubber layer mentioned above) having the same color as the main body rubber is arranged in an outer side of the white rubber layer 8. The cover rubber layer 9 is formed thin at a fixed thickness. The other portions of the side wall member 3 are constituted by a black rubber layer 11 having the same color as the main body rubber. A line, a letter or the like can be formed in the side wall portion 30 by vulcanizing the tire T, and thereafter scraping a predetermined region of the cover rubber layer 9 so as to expose the white rubber layer 8.

The raw tire T can be formed, for example, in accordance with the following method. The inner liner member 5 is first attached to an outer periphery of a cylindrical forming drum, and a carcass ply constituting the carcass layer 7 is attached to an outer periphery thereof. Next, the side wall member 3 and the other rubber members are arranged at predetermined positions of the carcass ply, the ring-shaped bead 1a is outward inserted near an end portion of the carcass ply, and an end portion is wound back via the bead 1a. Further, a center portion is inflated so as to be deformed along a tire shape, and a tread member 2 is attached to a tread portion.

Figure 2:
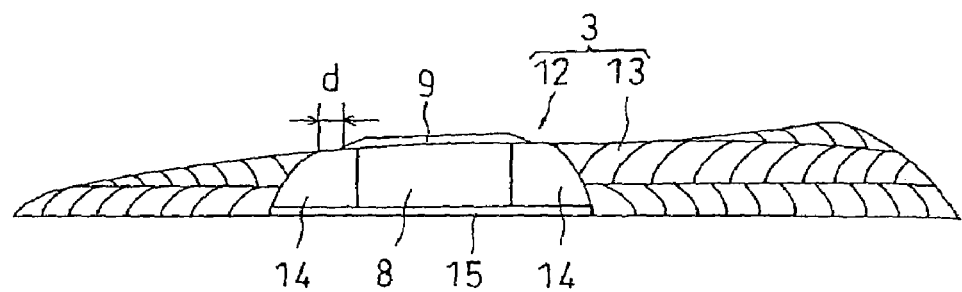
FIG. 2 is a cross sectional view of a side wall member.

Next, a description will be given of the side wall member 3. FIG. 2 is a cross sectional view of the side wall member in accordance with the present embodiment. The side wall member 3 shown in FIG. 2 is constituted by a band-like rubber member 12, and a rubber ribbon 13 wound around both sides in a width direction of the band-like rubber member 12. Further, the band-like rubber member 12 is constituted by a white rubber layer 8, a side rubber layer 14 arranged on both sides in a width direction of the white rubber layer 8 and showing the same color as the main body rubber, a cover rubber layer 9 arranged in an outer side of the white rubber layer 8, being thin and having a fixed thickness, and a cushion rubber layer 15 (an adhesive rubber layer) arranged in an inner side of the white rubber layer 8. The cushion rubber layer 15 is provided for the purpose of improving an adhesive property between the band-like rubber member 12 and the carcass ply.

It is preferable that the side rubber layer 14 and the rubber ribbon 13 are made of the same rubber composition, whereby a crack is inhibited from being generated. On the other hand, it is preferable that the cover rubber layer 9 is made of a rubber composition having a so-called transition preventing effect of preventing oil, an age resistor and the like in the white rubber layer 8 from transiting. A known composition can be used for the rubber composition for obtaining the transition preventing effect. In accordance with the present invention, the side rubber layer 14, the cover rubber layer 9 and the rubber ribbon 13 may be made of the same rubber composition.

In accordance with the present embodiment, a clearance d (for example, 5 to 10 mm) is provided between an end portion of the cover rubber layer 9 and an outer surface end portion of the side rubber layer 14. As mentioned above, in accordance with the present invention, it is preferable that the end portion of the cover rubber layer 9 and the outer surface end portion of the side rubber layer 14 positioned on an outer side in a width direction are apart from each other. If the cover rubber layer 9 is arranged over the width direction of the outer surface of the band-like rubber member 12, and an end portion thereof is bonded to the rubber ribbon 13, there is a risk that the crack is generated in an interface between the cover rubber layer 9 and the rubber ribbon 13 in the case that the cover rubber layer 9 is made of the different rubber composition from the rubber ribbon 13. Accordingly, this structure is not preferable.

Figure 3:
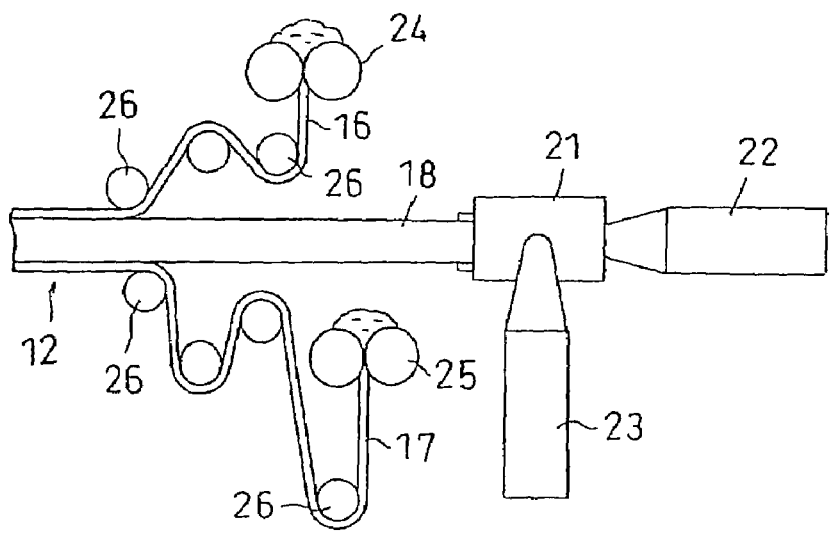
FIG. 3 is a schematic view of an apparatus for forming a band-like rubber member.

The band-like rubber member 12 can be formed, for example, by an apparatus shown in FIG. 3. The apparatus is provided with a molding die 21, a plurality of extruding machines 22 and 23 connected to the molding die 21, calendar rolls 24 and 25, and a guide roller 26. Each of the extruding machines 22 and 23 mixes the rubber composition forming the white rubber layer 8 and the rubber composition forming the side rubber layer 14 so as to feed in the molding die 21. The molding die 21 forms the side rubber layer 14 in a predetermined cross sectional shape while bonding the side rubber layer 14 to both sides in the width direction of the white rubber layer 8. On the other hand, in the calendar roll 24, the rubber composition forming the cover rubber layer 9 is rolled and a rubber sheet 16 is formed. The rubber sheet 16 is thin and has a fixed thickness, for example, of 0.2 to 1.6 mm. The rubber sheet 16 is guided by a guide roller 26 and is attached to the outer side of a formed product 18 extruded by the molding die 21. In the same manner, in the calendar roll 25, the rubber composition forming the cushion rubber layer 15 is rolled, forms a rubber sheet 17 having a fixed thickness, and is attached to an inner side of the formed product 18. Since the formed product 18 just after the extrusion is in a hot state, each of the rubber sheets 16 and 17 is effectively attached.

In this case, the rubber composition is obtained by mixing and preparing the rubber material and the blend material in accordance with the usual manner. The rubber material is not particularly limited, and can employ a general rubber such as a natural rubber, a styrene-butadiene rubber (SBR), a butadiene rubber (BR), an isoprene rubber (IR) and the like. Further, the extruding machines 22 and 23, the molding die 21 and the like can employ the known ones.

The formed band-like rubber member 12 is arranged in an outer peripheral surface of the cylindrical forming drum, or is attached to the carcass ply on the forming drum, and the rubber ribbon 13 is wound around both sides in the width direction. The winding apparatus and the winding method of the rubber ribbon 13 can employ the known ones. For example, the rubber ribbon 13 can be spirally wound with an overlap in the tire peripheral direction by rotating the forming drum in a predetermined direction in a state in which a winding start end of the rubber ribbon 13 is fixed to an end portion of the band-like rubber member 12, and moving the rubber ribbon 13 in the drum axial direction. At this time, the width and the cross sectional shape of the desired side wall member 3 can be obtained, and the white rubber layer 8 can be arranged at a predetermined position, by appropriately adjusting a rotating speed of the forming drum or a moving speed in the drum axial direction of the rubber ribbon 13.

In this case, as shown in FIG. 2, it is preferable that an end portion of the band-like rubber member 12 (an end portion of the side rubber layer 14 in the present embodiment) is inclined so as to have a skirt shape. Accordingly, it is easy to continuously join the rubber ribbon 13 and it is possible to preferably prevent the step from being generated in the joint portion. The rubber ribbon 13 shown in FIG. 2 is conceptually described, and is actually finer, and a cross sectional shape thereof is complex.

The rubber ribbon 13 is made of an unvulcanized rubber composition in which a width and a thickness are comparatively small, and each of the sizes can be variously changed in correspondence to a tire size or the like. Further, the cross sectional shape of the rubber ribbon 13 is not particularly limited, but can employ a preferable shape such as a wide rectangular shape, a trapezoidal shape, a crescent shape in correspondence to the cross sectional shape of the member. The rubber ribbon 13 may be continuously wound, or may be discontinuously provided. Further, the cross sectional shape or the size of the rubber ribbon 13 may be changed in the middle of the winding. The rubber ribbon 13 may supply the extrusion molded product while winding out from the temporarily wound goods, or may supply the extrusion molded product as it is.

In this case, it is preferable that the width of the band-like rubber member 12 is 40 to 150 mm. If the width of the band-like rubber member 12 is less than 40 mm, the winding area of the rubber ribbon 13 becomes great, and it takes long time for forming the tire. On the other hand, if it is more than 150 mm, the effect of improving the uniformity on the basis of the winding of the rubber ribbon 13 is small. In this invention, the band-like rubber member 12 is employed in correspondence to the display region of the line, the letter and the like formed in the side wall portion 30. In other words, it is possible to form the side wall member 3 corresponding to each of the tire sizes only by preparing the band-like rubber member 12 having the white rubber layer 8 (for example, 20 to 70 mm) in each of the widths, whereby the number of the parts can be reduced.

After the formed raw tire T is vulcanized within the mold, a predetermined region of the cover rubber layer 9 is scraped by a buff or the like. Accordingly, the white rubber layer 8 is exposed from the buff surface, and the line, the letter or the like is formed. In this case, the number, the width, the interval and the like of the formed line are not particularly limited, and the letter such as a maker logo, a pattern or the like can be formed in addition to the line. Further, the different color rubber layer is not limited to the white rubber layer 8, but may have a different color from the main body rubber (generally showing a black color).

Figure 4A:
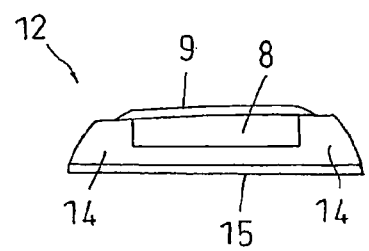
FIGS. 4A-4B and FIGS. 5A-5D are cross sectional views of a band-like rubber member in accordance with another embodiment.

Other Embodiment (1) The embodiment mentioned above shows the example of the band-like rubber member 12 in which the side rubber layer 14 is arranged on both sides in the width direction of the white rubber layer 8, however, the present invention may employ an embodiment in which the thickness of the white rubber layer 8 is made smaller so as to be buried in the side rubber layer 14, as shown in FIG. 4A. Accordingly, it is possible to improve an adhesive property between the side wall member 3 and the carcass ply.

Figure 4B:
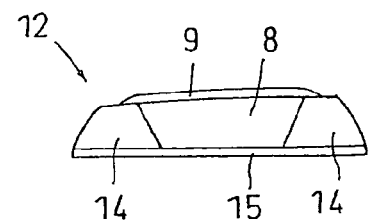

Further, the embodiment mentioned above shows the example in which the boundary between the white rubber layer 8 and the side rubber layer 14 is in parallel to the thickness direction of the band-like rubber member 12, however, the present invention may be structured, as shown in FIG. 4B, such that the boundary is inclined with respect to the thickness direction of the band-like rubber member 12. Accordingly, it is possible to secure the display region of the line or the like large while improving the adhesive property of the band-like rubber member 12. The band-like rubber member 12 shown in FIGS. 4A and 4B can be formed, for example, by using the molding die 21 which can obtain the respective cross sectional shapes in the apparatus shown in FIG. 3.

(2) The present invention is not particularly limited in the forming method of the other rubber members than the side wall member. Further, the embodiment mentioned above shows the example in which the cushion rubber layer 15 is provided in the band-like rubber member 12, however, the present invention is not limited to this.

Figure 5A:
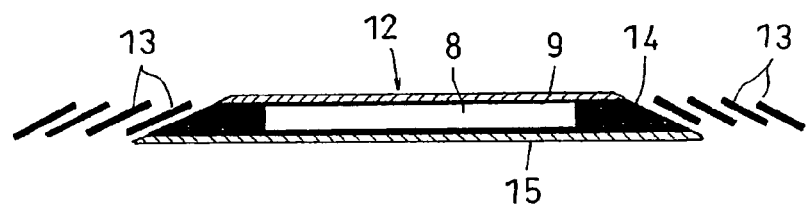
Figure 5B:
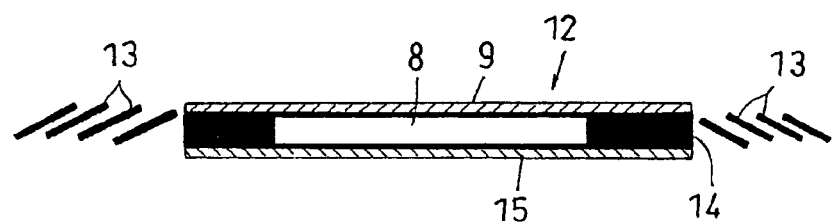
Figure 5C:
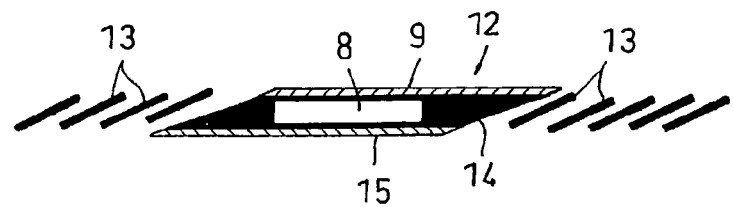
Figure 5D:
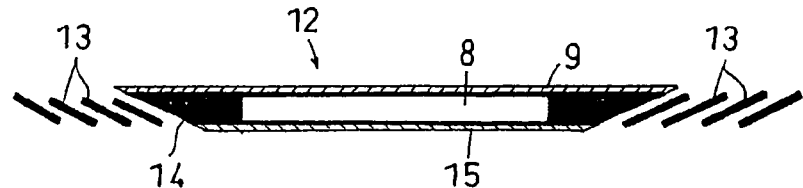
Figure 6:
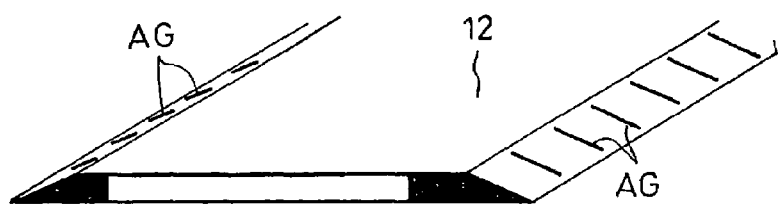
FIG. 6 is a perspective view of a band-like rubber member in accordance with another embodiment.

(3) The embodiment mentioned above shows the example in which the rubber ribbon is bonded to both sides in the width direction of the band-like rubber member by arranging the band-like rubber member in the forming drum and thereafter winding the rubber ribbon around both sides in the width direction, however, in accordance with the present invention, the band-like rubber member may be attached and bonded after previously winding the rubber ribbon (refer to FIG. 5D).

(4) The embodiment mentioned above shows the example in which the band-like rubber member is arranged in the cylindrical forming drum, and the rubber ribbon is thereafter wound around both sides in the width direction thereof, and is thereafter formed (shaped) in the tire shape, however, in accordance with the present invention, the rubber ribbon may be wound around the side wall after being shaped. In this case, the rubber ribbon can be spirally wound with an overlap in the tire peripheral direction by moving the rubber ribbon in the tire radial direction while rotating the formed product after being shaped around the tire axis.

(5) The embodiment mentioned above shows the example in which the shape of the both side surfaces of the band-like rubber member 12 is formed in the shape shown in FIG. 2, however, in accordance with the present invention, the shape of the both side surfaces of the band-like rubber member 12 is not particularly limited, but may be formed, for example, in a shape shown in FIGS. 5A to 5D.

In the example shown in FIG. 5A, the both side surfaces of the band-like rubber member 12 form in a downward expanded inclined surface. In this example, the band-like rubber member 12 is comprised of the white rubber layer 8, the side rubber layer 14 arranged on both sides in the width direction of the white rubber layer 8 and showing the same color as the main body rubber, the cover rubber layer 9 arranged in the outer side of the white rubber layer 8, being thin and having the fixed thickness, and the cushion rubber layer 15 (the adhesive rubber layer) arranged in the inner side of the white rubber layer 8. The inclined surface is formed by setting the end surface of the side rubber layer 14 to the inclined surface. The rubber ribbon 13 is spirally wound along the tire peripheral direction so as to be put on the inclined surface.

In the example shown in FIG. 5B, both side surfaces of the band-like rubber member 12 form an approximately vertical end surface, and are formed as the side rubber layer 14 having the rectangular cross sectional shape.

In the example shown in FIG. 5C, one side surface of the band-like rubber member 12 forms a downward expanded inclined surface, and the other side surface forms an upward expanded inclined surface. In this example, the rubber ribbon bonded to the upward expanded inclined surface is previously wound, the band-like rubber member is attached and bonded thereto, and the rubber ribbon on the other side is next wound.

In the example shown in FIG. 5D, both side surfaces of the band-like rubber member 12 form the upward expanded inclined surface. In this example, the rubber ribbon on both sides is previously wound and the band-like rubber member is attached and bonded thereto.

(6) The embodiment mentioned above shows the example in which the both side surfaces of the band-like rubber member are formed by a flat surface, however, in the present invention, an air bleeding groove may be formed on the both side surfaces of the band-like rubber member. The air bleeding groove can be formed in accordance with a knurling process, a mold stamping process or the like. A direction and a shape of the air bleeding groove may be variously set, however, preferably have a groove at an angle of 0 to 60 degrees with respect to the width direction of the band-like rubber member.

In order to effectively achieve the air bleeding at the time of the forming process, an interval of the air bleeding groove is preferably 2 to 30 mm, a groove width is preferably 0.5 to 2.0 mm, and a groove depth is preferably 0.5 to 2.0 mm.

Figure 7:
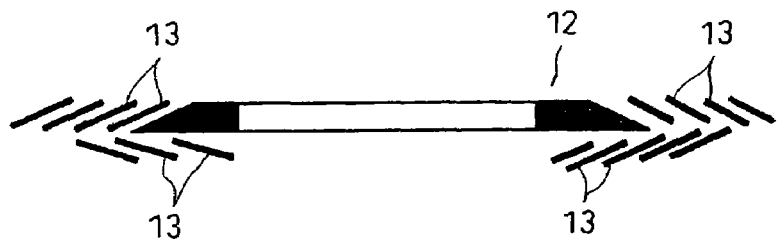
FIG. 7 is a cross sectional view of a band-like rubber member in accordance with another embodiment.
Figure 8:
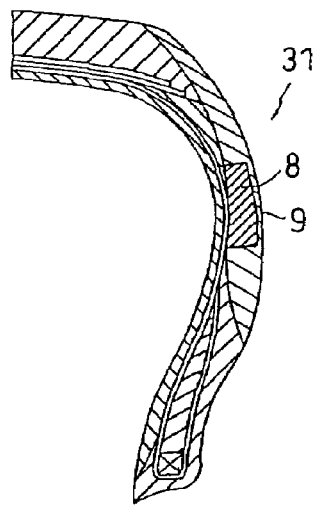
FIG. 8 is a cross sectional view showing a side wall portion of a conventional raw tire.
Figure 9:
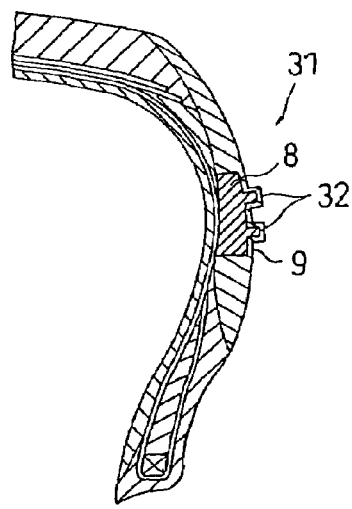
FIG. 9 is a cross sectional view showing a side wall portion of a conventional vulcanized tire.

(7) In the embodiment mentioned above, there is shown the example in which the rubber ribbon is not wound around the lower side of the lower surface of the band-like rubber member, however, in accordance with the present invention, the rubber ribbon 13 may be previously wound around the lower side of the lower surface of the band-like rubber member 12, as shown in FIG. 7. Accordingly, it is possible to effectively prevent the air from being mixed in at both end portions of the band-like rubber member 12 at the time of winding the rubber ribbon 13 around the inclined surface.

EXAMPLE

A description will be given below of an example and the like particularly showing the structure and the effect of the present invention. In this case, a test tire having a tire size of 265/70R16 is used for evaluating the following items.

(1) Forming Time

A time required for forming the side wall member at the time of manufacturing the test tire is measured, and is evaluated on the basis of an index number by setting a result of a comparative example 1 to 100. The larger the index number is, the shorter the forming time is, thereby showing an excellence in productivity.

(2) Uniformity

A uniformity of the tire is evaluated by measuring a radial force valuation (RFV) on the basis of a testing method defined in JIS D 4233. In particular, the evaluation is executed by pressing the tire to the rotating drum such that a predetermined load is applied, and measuring a fluctuation amount of a reaction force in the radial direction generated at the time of rotating the tire while keeping an interval between the both shafts constant. The number of the samples is set to twenty four. The evaluation is executed on the basis of an index number by setting a result of the comparative example 1 to 100. The larger the index number is, the more the uniformity is excellent.

Comparative Example

A test tire in which the side wall portion is made from a side wall member integrally formed in accordance with an extrusion molding is set to a comparative example 1, and a test tire in which the side wall portion is structured by a side wall member formed by spirally winding the rubber ribbon over the forming drum in the tire peripheral direction is set to a comparative example 2.

EXAMPLE

The band-like rubber member is formed in accordance with the method mentioned above, and the side wall member is formed by winding the rubber ribbon around both sides in the width direction thereof. The items mentioned above are evaluated by fixing the thickness of the band-like rubber member to 4 mm, and changing each of the widths of the band-like rubber member.

TABLE 1

|  | Comp. Example 1 | Example 1 | Example 2 | Example 3 | Example 4 | Example 5 | Comp. Example 2 |
| --- | --- | --- | --- | --- | --- | --- | --- |
| Width of band-like rubber member | — | 160 mm | 150 mm | 100 mm | 40 mm | 35 mm | — |
| Forming time | 100 | 95 | 92 | 90 | 85 | 75 | 60 |
| Uniformity | 100 | 115 | 125 | 130 | 132 | 135 | 140 |

As shown in Table 1, since the comparative example 1 is formed only by attaching the side wall member obtained in accordance with the extrusion molding, a forming time is shortest. However, since the step or the like is generated in the joint portion of the rubber member, the uniformity of the tire is comparatively low. Further, although not listed as the evaluation items, there is a problem that the number of the parts is increased because it is necessary to prepare a lot of side wall members in correspondence to the respective tire sizes. Since the comparative example 2 is structured such that the side wall member is formed by winding the rubber ribbon, the comparative example 2 is excellent in the uniformity, however, since it is necessary to wind the rubber ribbon several times over, the forming time becomes comparatively long.

On the other hand, in the examples 1 to 5, it is found that the forming time and the uniformity thereof are within the preferable ranges. Accordingly, it is possible to reduce the number of the parts while securing the productivity and the uniformity well. In this case, in the examples 2 to 4, it is clear that a balance between the forming time and the uniformity is more preferable.

What is claimed is:

1. A manufacturing method of a pneumatic tire in which a portion having a different color from a main body rubber is formed in a side wall portion, comprising:

a step of forming a band-like rubber member having (i) a different color rubber layer having a different color from a main body rubber, (ii) side rubber layers having the same color as the main body rubber and being arranged on inner and outer sides of the different color rubber layer, respectively, with respect to a tire peripheral direction, each side rubber layer being smaller than the different color rubber in the tire peripheral direction, and (iii) a thin rubber layer having the same color as the main body rubber formed on a top side of said different color rubber layer, which top side is an exposed side of the side wall portion, wherein the step of forming the band-like rubber member comprises extrusion-molding the different color rubber layer and the side rubber layers while bonding the side rubber layers to the inner and outer sides of the different color rubber layer; and attaching the thin rubber layer to the top side of the different color rubber layer bonded together with the side rubber layers;

a step of arranging said band-like rubber member on an outer peripheral surface of a cylindrical forming drum or attaching said band-like rubber member to a carcass ply on a forming drum; and a step of spirally winding a rubber ribbon multiple rounds with an overlap along a tire peripheral direction so as to attach a portion formed by the rubber ribbon to each side of said band-like rubber member with respect to the tire peripheral direction on the side wall portion.

2. The manufacturing method of a pneumatic tire as claimed in claim 1, wherein both side surfaces of said band-like rubber member form an inclined surface expanding to a lower side, and an air bleeding groove is formed in the inclined surface.

3. The method according to claim 1, wherein the side rubber layers and the rubber ribbon that are made of the same rubber composition are used.

4. A method of manufacturing a side wall portion of a pneumatic tire, comprising:

forming a band-shaped rubber member comprising (i) a different color rubber layer, (ii) side rubber layers arranged on inner and outer sides of the different color rubber layer, respectively, with respect to a tire peripheral direction, each side rubber layer being smaller than the different color rubber in the tire peripheral direction, and (iii) a thin rubber layer formed on top of the different color rubber layer, wherein the different color rubber layer has a color different from that of the thin rubber layer, and the side rubber layers and the thin layer have the same color as the main body rubber, wherein the step of forming the band-shaped rubber member comprises extrusion molding the different color rubber layer and the side rubber layers while bonding the side rubber layers to the inner and outer sides of the different color rubber layer; and attaching the thin rubber layer to the top side of the different color rubber layer bonded together with the side rubber layers;

arranging said band-shaped rubber member on an outer peripheral surface of a cylindrical forming drum or attaching said band-shaped rubber member to a carcass ply on a forming drum; and winding rubber ribbons multiple rounds in overlapping spirals so as to attach a portion formed by the rubber ribbons to each side of the band-shaped rubber member with respect to the tire peripheral direction on the side wall portion, whereby the band-shaped rubber member with the rubber ribbons constitute a side wall portion of a pneumatic tire.

5. The method according to claim 4, further comprising vulcanizing the pneumatic tire; and scraping a region of the thin rubber layer in a line, letter, number, or symbol to expose the different color rubber layer therethrough.

6. The method according to claim 4, wherein the arranging step comprises:

providing a carcass ply attached to an inner liner member attached to an outer periphery of a cylindrical forming drum;

placing the band-shaped rubber member and winding the rubber ribbons around an outer periphery of the carcass ply on the cylindrical forming drum; and shaping the carcass ply to form the pneumatic tire.

7. The method according to claim 4, wherein the step of forming the band-shaped rubber member further comprises attaching a cushion rubber layer to a surface of the different color rubber layer bonded with the side rubber layers opposite to the thin rubber layer.

8. The method according to claim 4, wherein the step of forming the band-shaped rubber member further comprises forming inclined surfaces on edges of the side rubber layers; and forming air bleeding grooves in the inclined surfaces.

9. The method according to claim 8, wherein the air bleeding grooves have a depth of 0.5 to 2.0 mm.

10. The method according to claim 9, wherein the air bleeding grooves are positioned at intervals of 2 to 30 mm.

11. The method according to claim 4, wherein the thin rubber layer and the rubber ribbons are arranged so as to have a clearance between the thin rubber layer and the rubber ribbons in a width direction of the band-shaped rubber member.

12. The method according to claim 4, wherein the side rubber layers and the rubber ribbon that are made of the same rubber composition are used.

* * * * *